United States Patent
Hu et al.

(10) Patent No.: US 10,019,151 B2
(45) Date of Patent: Jul. 10, 2018

(54) METHOD AND APPARATUS FOR MANAGING USER INTERFACE ELEMENTS ON A TOUCH-SCREEN DEVICE

(71) Applicant: MOTOROLA SOLUTIONS, INC, Schaumburg, IL (US)

(72) Inventors: Hai-Qing Hu, Chengdu (CN); Meng Ge Duan, Chengdu (CN); Jing Wang, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 21 days.

(21) Appl. No.: 14/764,235

(22) PCT Filed: Feb. 8, 2013

(86) PCT No.: PCT/CN2013/071585
§ 371 (c)(1),
(2) Date: Jul. 29, 2015

(87) PCT Pub. No.: WO2014/121523
PCT Pub. Date: Aug. 14, 2014

(65) Prior Publication Data
US 2015/0370442 A1    Dec. 24, 2015

(51) Int. Cl.
*G06F 3/048* (2013.01)
*G06F 3/0488* (2013.01)

(52) U.S. Cl.
CPC ........ *G06F 3/0488* (2013.01); *G06F 3/04883* (2013.01); *G06F 3/04886* (2013.01); *G06F 2203/04808* (2013.01)

(58) Field of Classification Search
CPC ........ G06F 3/0488; G06F 3/041; G06F 3/048; G06F 1/1626; H04N 1/3212; B60K 35/00
(Continued)

(56) References Cited

U.S. PATENT DOCUMENTS 8,836,658 B1    9/2014    Jia et al.
2009/0109187 A1*   4/2009    Noma ................. G06F 3/04883
                                                                   345/173

(Continued)

FOREIGN PATENT DOCUMENTS

CN    101587419 A    11/2009
JP    2010020601 A    1/2010

(Continued)

OTHER PUBLICATIONS

PCT International Search Report Dated Nov. 21, 2013 for Counterpart Application PCT/CN2013/071585.

(Continued)

*Primary Examiner* — Lin Li

(57) ABSTRACT

A method and apparatus for managing a touch-screen device is provided herein. During operation UI elements are arranged and re-arrange dynamically and based on user's current contact locations on the touch screen. Preferably, the contact positions correspond to a user's finger positions so that the UI elements are automatically placed where a person's fingers make contact with the touch screen. Because the UI elements on the touch screen always "look for" the user's fingers, instead of the user looking for them, it becomes much easier and more time-efficient for a user to find a particular UI element.

12 Claims, 12 Drawing Sheets

(58) Field of Classification Search
USPC .................................. 345/173, 168; 715/766
See application file for complete search history.

(56) References Cited

U.S. PATENT DOCUMENTS

| | | | |
|---|---|---|---|
| 2009/0289903 A1 | 11/2009 | Chen et al. | |
| 2009/0327975 A1* | 12/2009 | Stedman | G06F 3/0416 715/863 |
| 2010/0192109 A1* | 7/2010 | Westerman | G06F 3/04883 715/863 |
| 2011/0035688 A1* | 2/2011 | Kinoshita | G06F 3/0481 715/763 |
| 2011/0078622 A1 | 3/2011 | Messig et al. | |
| 2011/0078624 A1 | 3/2011 | Missig et al. | |
| 2011/0115711 A1* | 5/2011 | Gunawan | G06F 1/1626 345/169 |
| 2011/0163971 A1* | 7/2011 | Wagner | G06F 3/04817 345/173 |
| 2011/0310024 A1 | 12/2011 | Sakatsume | |
| 2012/0032979 A1* | 2/2012 | Blow | G06F 1/1626 345/647 |
| 2012/0154313 A1* | 6/2012 | Au | G06F 3/04883 345/173 |
| 2012/0159364 A1* | 6/2012 | Hyun | G06F 3/0481 715/766 |
| 2012/0235938 A1* | 9/2012 | Laubach | G06F 3/0416 345/173 |
| 2012/0242581 A1* | 9/2012 | Laubach | G06F 3/04883 345/173 |
| 2012/0242586 A1 | 9/2012 | Krishnaswamy et al. | |
| 2012/0245745 A1 | 9/2012 | Vandevelde et al. | |
| 2012/0262462 A1 | 10/2012 | Montan et al. | |
| 2012/0278745 A1* | 11/2012 | Kim | G06F 3/04817 715/769 |
| 2013/0069860 A1* | 3/2013 | Davidson | G06F 3/0416 345/156 |
| 2013/0111403 A1* | 5/2013 | Nakamura | B60K 35/00 715/810 |
| 2013/0156396 A1* | 6/2013 | Kim | H04N 1/32112 386/225 |
| 2014/0139475 A1* | 5/2014 | Wada | G06F 3/0416 345/173 |
| 2014/0164989 A1* | 6/2014 | Kuhne | G06F 3/0488 715/790 |
| 2015/0149954 A1* | 5/2015 | Lin | G06F 3/0488 715/781 |
| 2015/0153925 A1* | 6/2015 | Li | G06F 3/04883 715/768 |

FOREIGN PATENT DOCUMENTS

| | | | | |
|---|---|---|---|---|
| JP | 2013/229004 | * | 11/2013 | ............ G06G 3/048 |
| WO | 2012021417 A1 | | 2/2012 | |
| WO | 2012140883 A1 | | 10/2012 | |

OTHER PUBLICATIONS

Corresponding application, U.S. Appl. No. 14/765,944, filed Aug. 5, 2015, mailed: Oct. 7, 2016, all pages.

* cited by examiner

METHOD AND APPARATUS FOR MANAGING USER INTERFACE ELEMENTS ON A TOUCH-SCREEN DEVICE

This application is a National Stage filing under 35 USC § 371 of co-pending Patent Cooperation Treaty international application having Serial No. PCT/CN2013/071585 (the 'PCT international application') filed on Feb. 8, 2013. This application claims priority to the PCT international application, the entire contents of which are incorporated herein by reference.

FIELD OF THE INVENTION

The present invention generally relates to touch-screen devices, and more particularly to a method and apparatus for managing user interface elements on a touch-screen device.

BACKGROUND OF THE INVENTION

Touch-sensitive displays (also known as "touch screens") are well known in the art. Touch screens are used in many electronic devices to display control buttons, graphics, text, and to provide a user interface through which a user may interact with the device. A touch screen detects and responds to contact on its surface. A device may display one or more control buttons, soft keys, menus, and other user-interface elements on the touch screen. A user may interact with the device by contacting the touch screen at locations corresponding to the user-interface (UI) elements with which they wish to interact.

One problem associated with using touch screens on portable devices is quickly and easily finding a desired user-interface element. Considering the rich functionalities the application can provide, there may be lots of UI elements (e.g. buttons, knobs, . . . , etc.) on a display. A major problem is that it may be troublesome for user to find the right UI element in a timely manner, especially in a mission critical situation. Therefore a need exists for a method and apparatus for managing a touch-screen device that makes it easier and more time-efficient for a user to find a particular UI element.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need a method and apparatus for managing a touch-screen device is provided herein. During operation UI elements are arranged and re-arrange dynamically and based on user's current contact locations on the touch screen. Preferably, the contact positions correspond to a user's finger positions so that the UI elements are automatically placed where a person's fingers make contact with the touch screen. Because the UI elements on the touch screen always "look for" the user's fingers, instead of the user looking for them, it becomes much easier and more time-efficient for a user to find a particular UI element.

Figure 1:
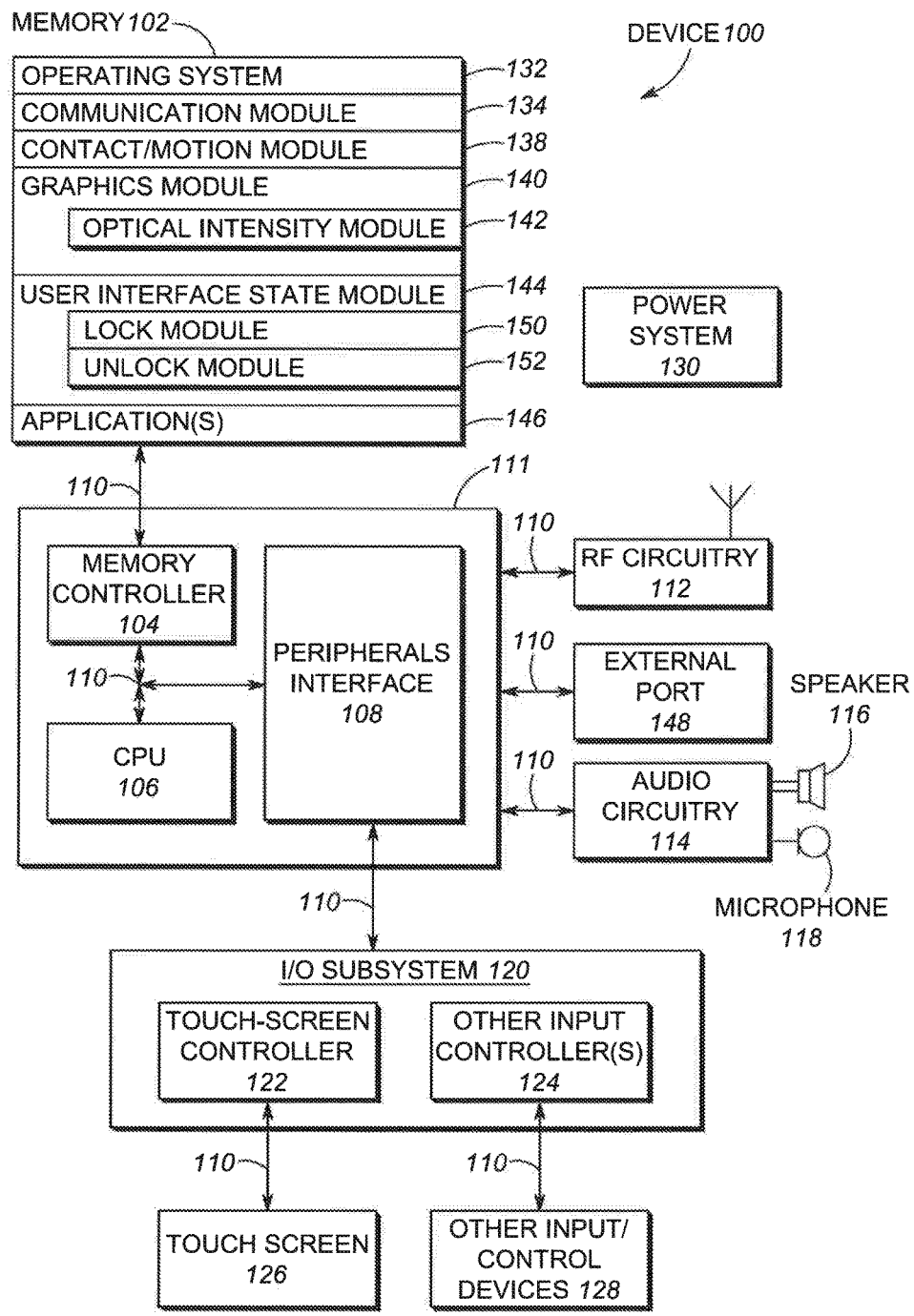
FIG. 1 is block diagram illustrating a general operational environment, according to one embodiment of the present invention.

Turning now to the drawings, where like numerals designate like components, FIG. 1 is a block diagram of a portable electronic device that preferably comprises a touch screen 126. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, a mobile phone, a police radio, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects, further details of which are described below.

The touch screen 126 also accepts input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or break of the contact) on the touch screen 126 and converts the detected contact into interaction with user-interface objects, such as one or more user-interface elements (e.g., soft keys), that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1. However, the touch screen 126 displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a stylus, finger, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, an electronic contact module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/contact module 138 detects contact with the touch screen 126, in conjunction with the touch-screen controller 122. The contact/contact module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/contact module 126 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state.

The one or more applications 130 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In one embodiment, the device 100 includes the touch screen 126, the touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

The device 100 may have a plurality of user interface states. A user interface state is a state in which the device 100 responds in a predefined manner to user input. In some embodiments, the plurality of user interface states includes a user-interface lock state and a user-interface unlock state. In some embodiments, the plurality of user interface states includes states for a plurality of applications.

As described above, one problem associated with using touch screens 126 on portable devices is quickly and easily finding a desired user-interface element. In particular it may be troublesome for user to find the right UI element with a timely manner, especially in a mission critical situation. In order to address this need, contact module 138 will detect a user's current finger positions on touch screen 126 and then instruct graphics module 140 to place predefined UI elements where a person's fingers make contact with the touch screen. The above technique makes it much easier and more time-efficient for a user to find a particular UI element.

Figure 2:
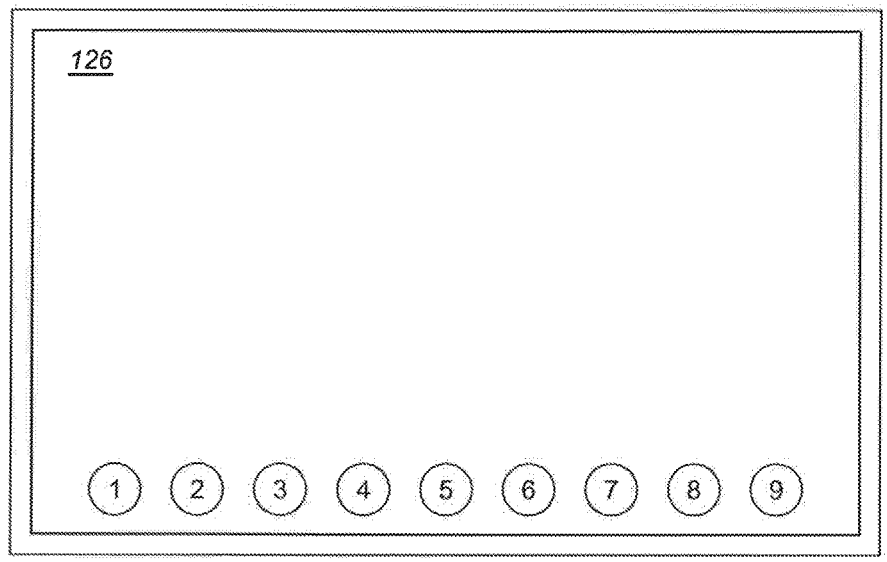
FIG. 2 through FIG. 20 illustrate placement of UI elements on a touch screen.

The above technique is illustrated in FIG. 2 through FIG. 13. As shown in FIG. 2, touch screen 126 has UI elements 1-9 displayed. For ease of illustration a plurality of UI elements 1-9 are displayed as circles, however, one of ordinary skill in the art will recognize that UI elements 1-9 can take an infinite number of shapes and sizes. UI elements 1-9 may all be a similar shape and size, or may be different shapes and sizes. Additionally, while only 9 UI elements are shown lying along an edge of touch screen 126, any number of UI elements may be present on touch screen 126, lying in any number of patterns and positions.

As is known in the art, UI elements 1-9 represent places where the user may interact, the interaction of which executes a particular function, application, or program. UI elements 1-9 may sometimes be referred to as controls or widgets. These controls or widgets may take any form to execute any function, some of which are described below:

Window—UI elements 1-9 may take the form of a paper-like rectangle that represents a "window" into a document, form, or design area.

Text box—UI elements 1-9 may take the form of a box in which to enter text or numbers.

Button—UI elements 1-9 may take the form of an equivalent to a push-button as found on mechanical or electronic instruments. Interaction with UI elements in this form serve to control functions on device 100. For example UI element 1 may serve to control a volume function for speaker 116, while UI element 2 may serve to key microphone 118.

Hyperlink—UI elements 1-9 may take the form of text with some kind of indicator (usually underlining and/or color) that indicates that clicking it will take one to another screen or page.

Drop-down list or scroll bar—UI elements 1-9 may take the form of a list of items from which to select. The list normally only displays items when a special button or indicator is clicked.

List box—UI elements 1-9 may take the form of a user-interface widget that allows the user to select one or more items from a list contained within a static, multiple line text box.

Combo box—UI elements 1-9 may take the form of a combination of a drop-down list or list box and a single-line textbox, allowing the user to either type a value directly into the control or choose from the list of existing options.

Check box—UI elements 1-9 may take the form of a box which indicates an "on" or "off" state via a check mark ☑ or a cross ☒. Sometimes can appear in an intermediate state (shaded or with a dash) to indicate mixed status of multiple objects.

Radio button—UI elements 1-9 may take the form of a radio button, similar to a check-box, except that only one item in a group can be selected. Its name comes from the mechanical push-button group on a car radio receiver. Selecting a new item from the group's buttons also deselects the previously selected button.

Cycle button or control knob—UI elements 1-9 may take the form of a button or knob that cycles its content through two or more values, thus enabling selection of one from a group of items.

Datagrid—UI elements 1-9 may take the form of a spreadsheet-like grid that allows numbers or text to be entered in rows and columns.

Switch—UI elements 1-9 may take the form of a switch such that activation of a particular UI element 1-9 toggles a device state. For example, UI element 1 may take the form of an on/off switch that controls power to device 100.

As described above, during operation contact module 138 will detect a user's current finger positions on touch screen 126 and then instruct graphics module 140 to place a plurality of predefined UI elements where a person's fingers make contact with the touch screen. The above technique makes it much easier and more time-efficient for a user to find a particular UI element.

All available UI elements can be configured to work under this new mode or they can be selected by the user to work under this mode. For example, a user may select a first plurality of UI elements to be assigned to the user contact points by either selecting them individually or dragging a "box" around them. Once selected, these elements will be placed where finger positions are detected. This is illustrated in FIG. 3.

Figure 3:
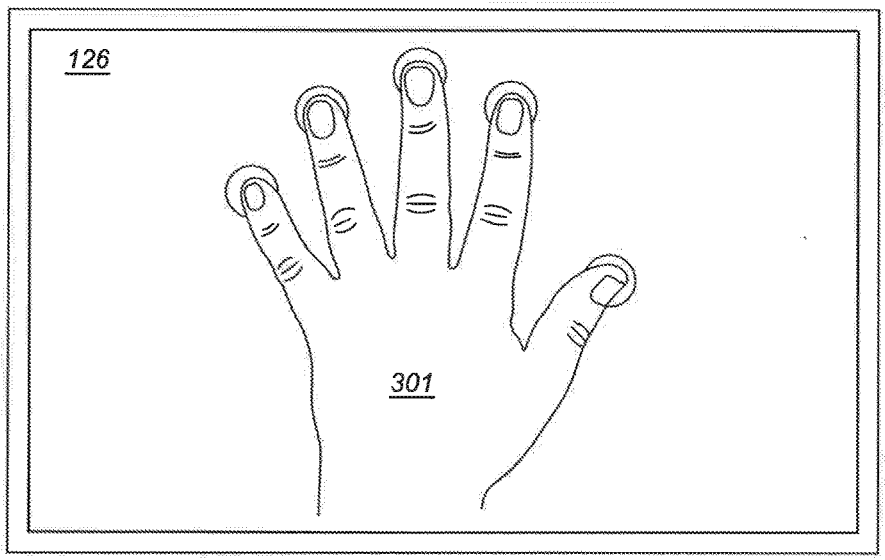

As shown in FIG. 3, a user's hand 301 has been placed in contact with touch screen 126 such that five finger positions make simultaneous contact with touch screen 126. Once detected by contact module 138, the simultaneous finger positions are determined and provided to graphics module 140. Graphics module 140 then places a plurality of selected UI elements where each finger made contact with touch screen 126. This is illustrated in FIG. 4.

Figure 4:
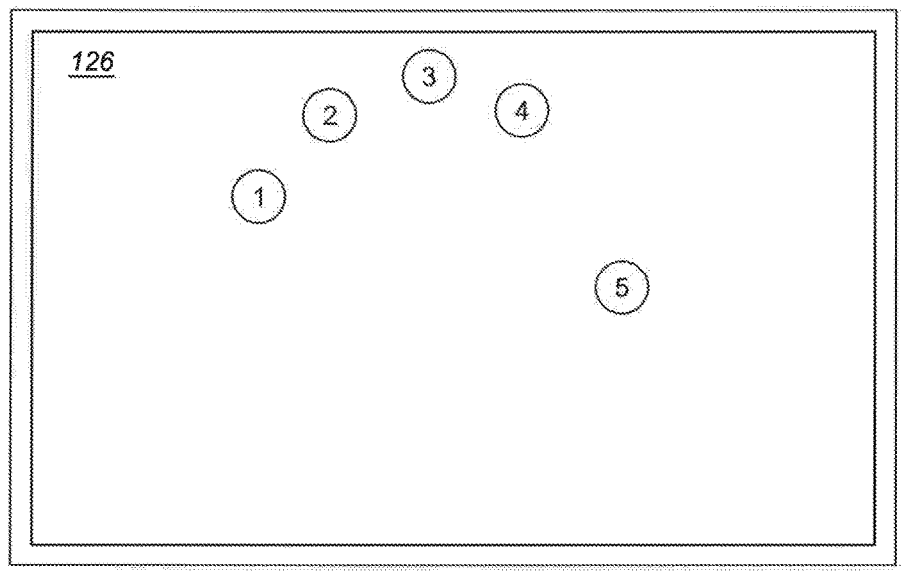

In FIG. 4 it is assumed that a user has pre-selected UI elements 1-5. As shown in FIG. 4, pre-selected UI elements 1-5 are positioned on touch screen 126 such that a single UI element is placed at each previous simultaneous finger contact point when a user removes their fingers from screen 126. Thus, as a user touches the screen in a simultaneous manner with multiple fingers, buttons (UI elements) moves to the finger contact points. If a user again touches the screen as described above, the buttons may be repositioned in accordance with the second touching. In one embodiment of the present invention, buttons (UI elements) only re-arrange themselves when either a different contacting point number (i.e., a different number of fingers make a reconnection with screen 126) is detected, or a same contacting point number is detected at different locations on the screen.

Figure 5:
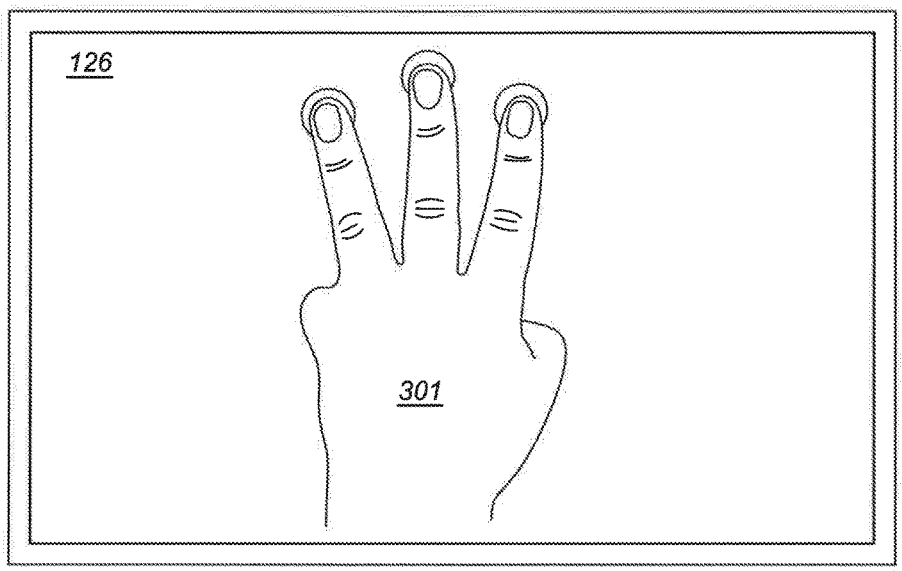
Figure 6:
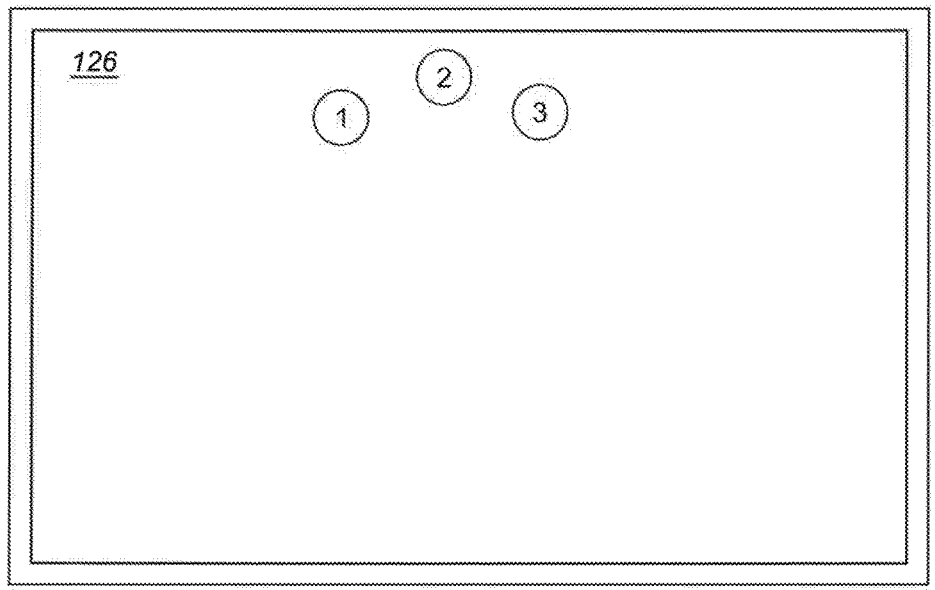

This is illustrated in FIG. 5 and FIG. 6 where the user again touches touch screen 126 (only this time simultaneously with three fingers) in FIG. 5. The result of the second touching is shown in FIG. 6 where three highest-priority UI elements are placed where the three fingers made contact with screen 126. It should be noted that each UI element 1-9 may be assigned a priority or a hierarchy so that when less than the total number of UI elements need to be placed on screen 126, graphics module 140 will place higher-priority UI elements before lower-priority UI elements.

Thus, the determination of what UI elements to place at each finger position may be made by the user by selecting a priority for each UI element. For example, element 1 may be placed before any other UI element. Element 2 may then take priority over every other UI element except UI element 1. The order of priority may continue until all desired UI elements 1-9 are given a priority. It should be noted that not every UI element may be given a priority. If this is the case, then only those UI elements given a priority will be displayed.

Figure 7:
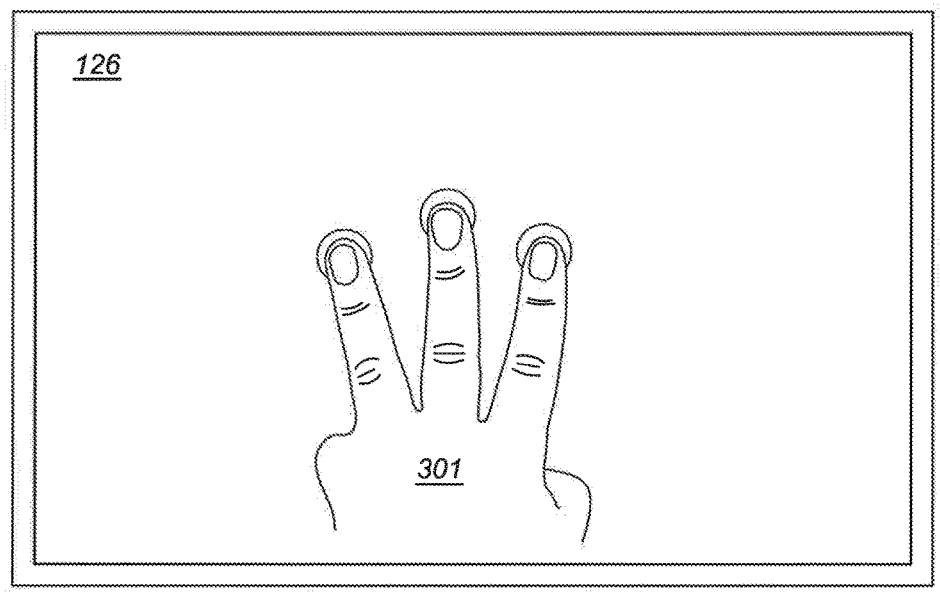
Figure 8:
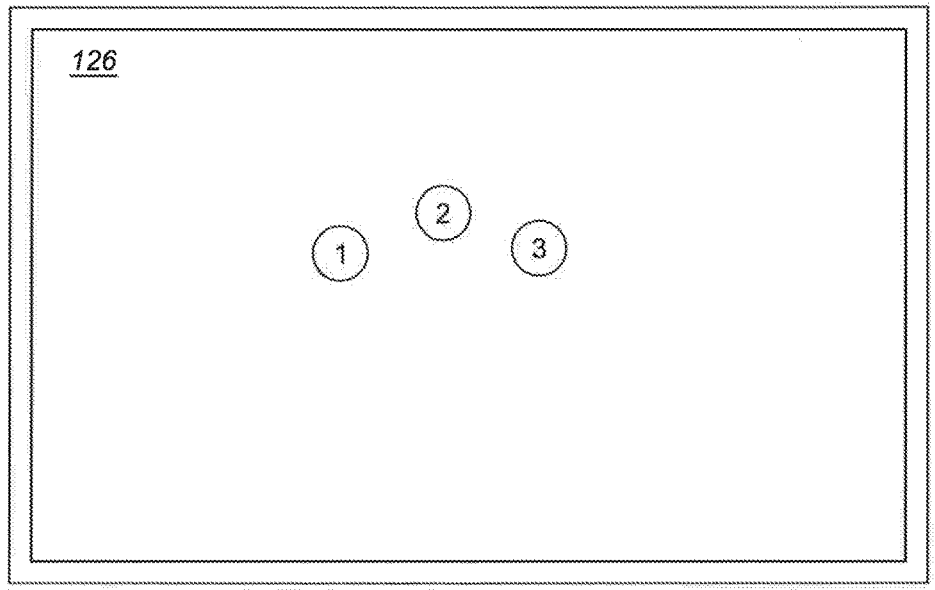

The above process may be repeated any number of times as illustrated in FIG. 7 and FIG. 8. As shown in FIG. 7 the user again makes contact with the touch screen 126 with three fingers, only this time at a different position on screen 126. As shown in FIG. 8, the highest priority UI elements are then placed, one at each finger position.

Layers:

If there exists more selected UI elements than finger positions detected, graphics module 140 may display all selected UI elements on the screen in "layers". The first display of all selected UI elements results in the highest priority UI elements being shown at the top layer, with all other selected UI elements being shown as underlying layers of UI elements such that each contact position has a similar number of UI elements shown.

In order to change from a first layer to a second layer a user can "swipe" the screen by dragging their finger contact points to a second location. The "dragging" is detected by contact/contact module 138 and graphics module 140 is notified. In response, graphics module 140 moves the top layer of UI elements to the back layer, and the second layer buttons move upfront and become active for user interaction. The previous top layer buttons move backwards and become inactive. This is illustrated in FIG. 9 through FIG. 12.

Figure 9:
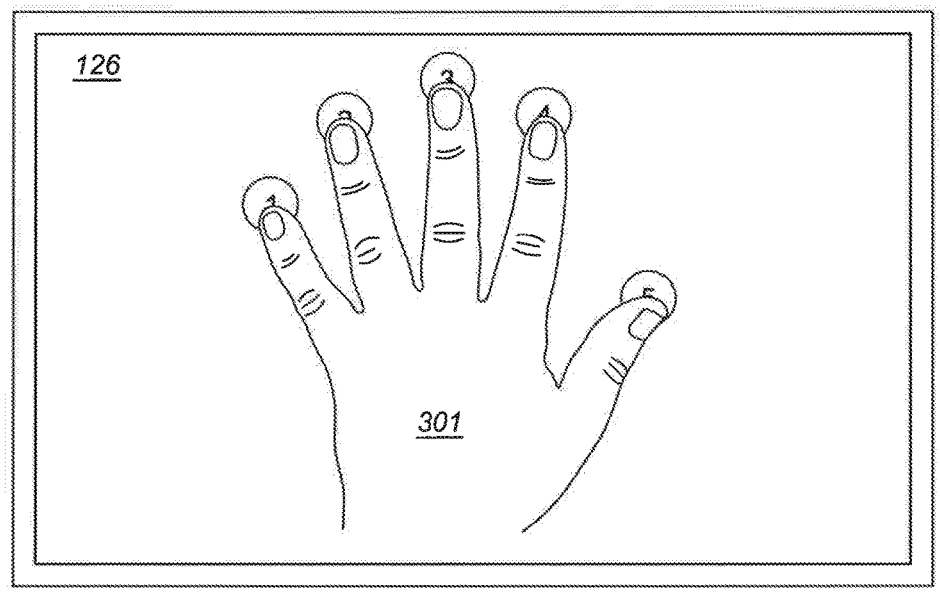
Figure 10:
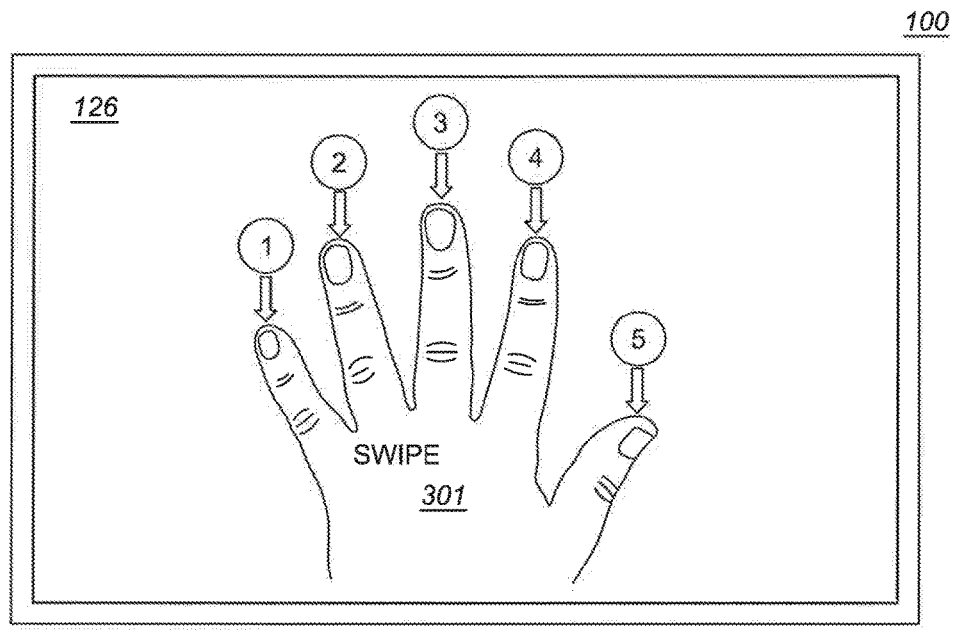
Figure 11:
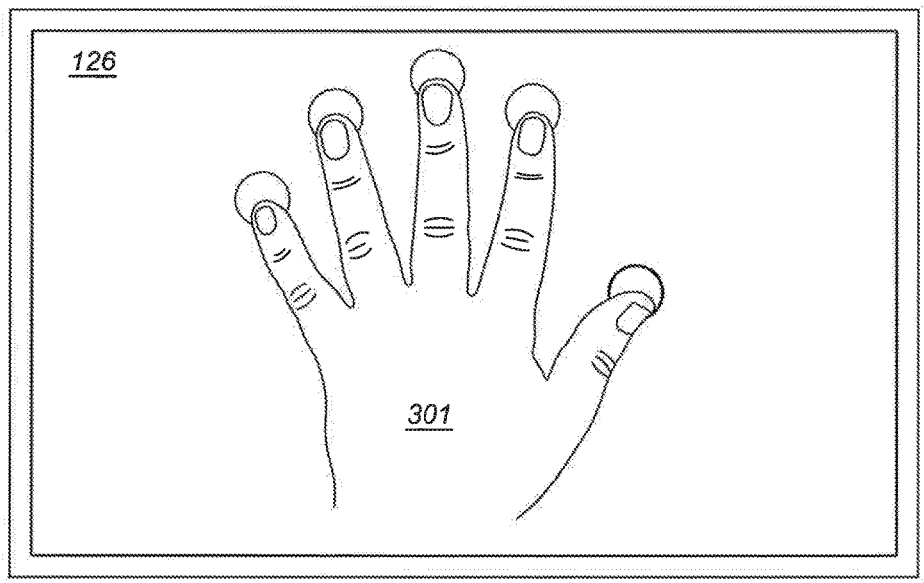

As shown in FIG. 9 a user touches the touch screen 126 in five spots. In response, UI elements 1-5 are positioned under each contact point. The user then "swipes" the touch screen 126 by dragging the contact points in any direction (downward in FIG. 10). New UI elements 6-9 then appear at the new contact points (FIG. 11). The user then removes their hand 301 from the touch screen 126 to reveal the new UI elements 6-9. (FIG. 12).

Figure 12:
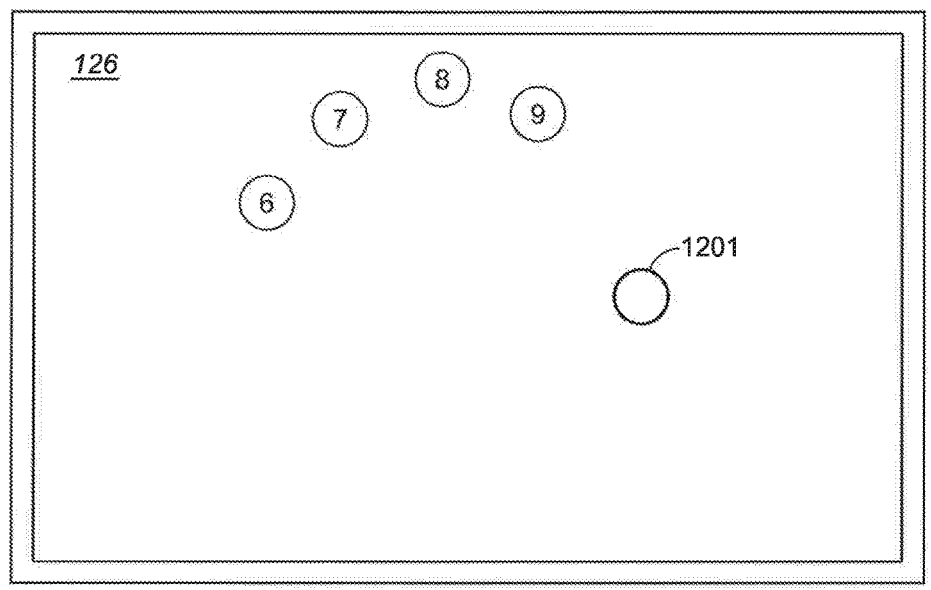

As is evident in FIG. 12, there exists a "dummy" contact point 1201. The dummy contact point 1201 is necessary because there are not enough UI elements selected to complete the second layer. Contact point 1201 will not be assigned any functionality.

Figure 13:
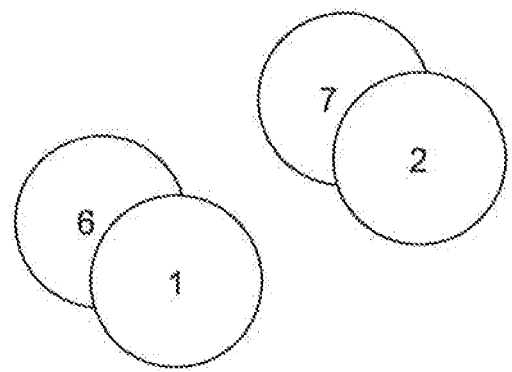

Although FIG. 9 through FIG. 12 did not have any graphical representation of sub-layers shown, in an alternate embodiment of the present invention, sub-layers may be graphically illustrated as layered below an active layer. This is illustrated in FIG. 13. As is evident, top layer has UI elements 1 and 2. Therefore, any touching of these UI elements will result in the execution of an application associated with UI element 1 or UI element 2. Thus, when the user makes contact with UI element 1, a first application is run, or a first button is modified. In a similar manner, when the user makes contact with UI element 2, a second application is run, or a second button is modified. When the layers are switched as described above, a lower layer surfaces, and the top layer is moved downward. This is illustrated in FIG. 14.

Figure 14:
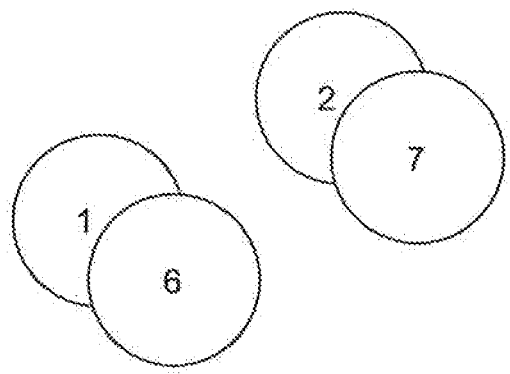

As shown in FIG. 14 the first layer having UI elements 1 and 2 has been moved to the bottom with the second layer having UI elements 6 and 7 moving to the top position. Thus, when the user makes contact with UI element 6, a third application is run, or a third button is modified. In a similar manner, when the user makes contact with UI element 7, a fourth application is run, or a fourth button is modified.

Figure 15:
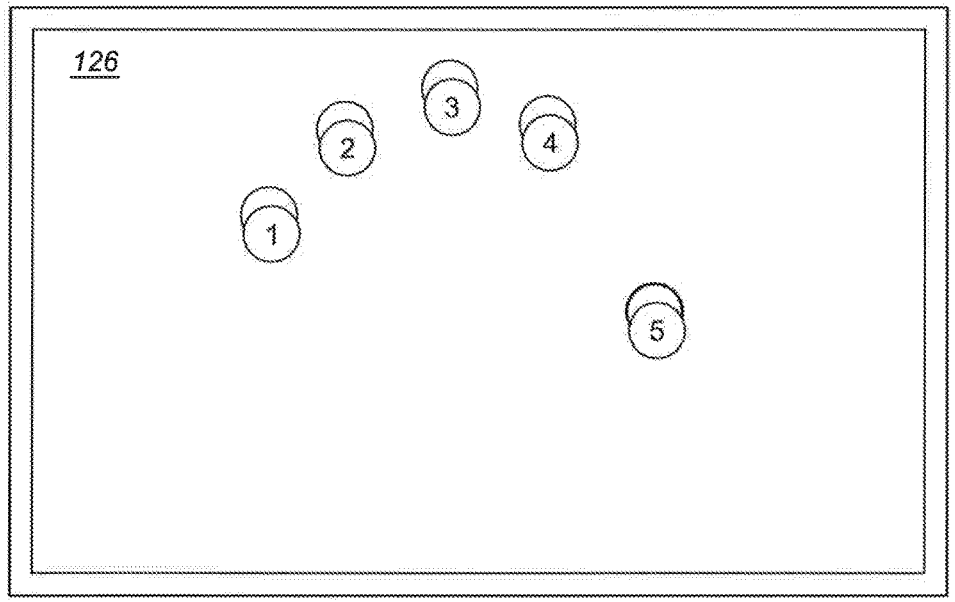
Figure 16:
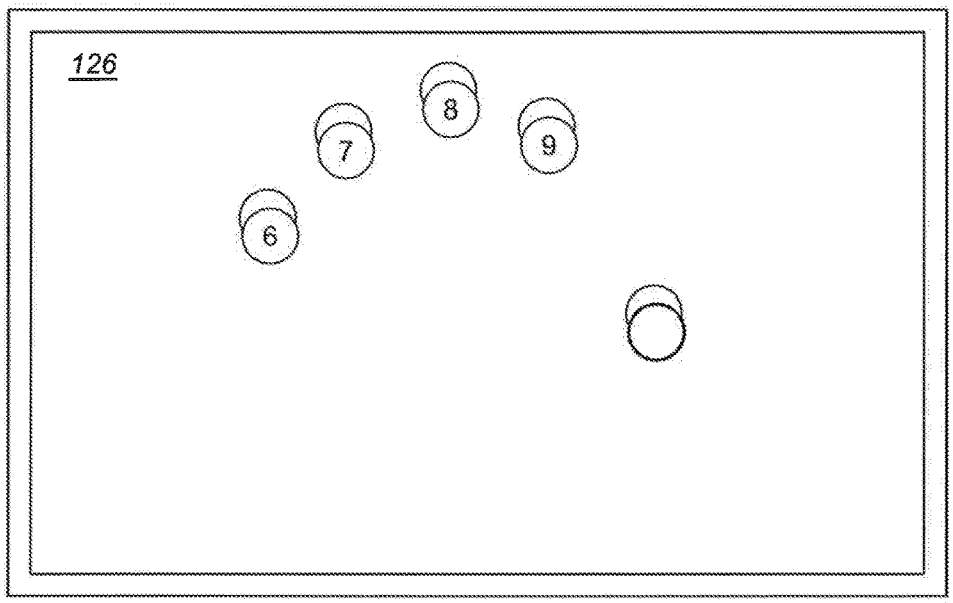

FIG. 15 and FIG. 16 illustrate 9 UI elements being positioned on touch screen 126 within two layers. As is evident in FIG. 15, 9 buttons (UI elements) form 2 layers; specifically 5 for a first layer and 4 for a second layer. The top layer buttons are active and capable for user interaction. Upon swiping as described above, the layers switch position (FIG. 16).

Audible Indication

During operation an audible indication may be provided by audio circuitry 114 when a user lifts any finger. Thus, when a UI element is activated by touching the UI element, a voice announcement plays out and lets the user know what button has been pressed. The user can put down that finger to tap that point to click on that button. This allows the user to click the button without looking at the screen.

In the foregoing specification, specific embodiments have been described. However, one of ordinary skill in the art appreciates that various modifications and changes can be made without departing from the scope of the invention as set forth in the claims below. For example, it is not necessary that the above description be limited to finger contact positions in order to place UI elements. In an alternate embodiment of the present invention any contact position on screen 126 will result in the placement of UI elements as described above. For example, contact may be made to screen 126 by a stylus, knuckle, other contact input technique. The above description used a person's finger for the ease of the understanding.

Additionally, multiple hands may be used to define contact points for placement of UI elements 1-9 so there may exist more than 5 contact points. The fingers may be from a single person or multiple persons. Thus it is possible to have more than 5 contact points on the touching screen at the same time, resulting in the display of more than 5 UI elements. Thus, according to the above description, there when there exist 10 UI elements, the user can use one hand to operate the first 5 and swipe to the second layer to operate the next 5. Alternatively, the user can also put both hands (10 fingers) in contact with screen 126 to display the 10 UI elements at one time.

The displaying of layers in FIG. 13 and FIG. 14 is only one way to convey layered information to a user. Any display may be utilized that conveys the change of particular UI elements from active to inactive and inactive to active. Thus, the presentation level, the UI elements are not necessarily to be visually laid upon each other. The UI elements of the adjacent layers can be place side by side, which is similar to a 2 dimensional "list". And the user can scroll the list for the right row of the UI elements. The other rows of UI elements can be invisible, visually faded out, transparent or rendered by any other visual technique, as long as they do not become obstacles on the screen and cause no false operation.

In one embodiment UI elements 1-9 are not assigned to specific fingers. UI elements 1-9 are assigned to contact points only, regardless of how contact is made. Thus it is not necessary to use any hand or finger recognition technique before the UI elements can appear at the contacting points.

The assignment of UI elements to contact points may be determined by a predefined rule and the contact point locations. In one embodiment, graphics module 140 defines the left up corner of the layout as the origin point and the right direction is the positive direction for the horizontal coordinate (x). The UI element having the highest priority of the current layer is placed at the left-most (lower x value) contact point and the UI element having the lowest priority is placed at the right-most contact points (higher x value).

Thus, when the user uses five fingers of his right hand to touch the screen, the 5 UI elements appear as 1, 2, 3, 4, 5, where the 1 is associated to the thumb and the 5 is associated to the little finger. However, when he changes to his left hand, the 5 UI element still appear as 1, 2, 3, 4, 5, where the 5 is associated to the thumb and the 1 is associated to the little finger.

Figure 17:
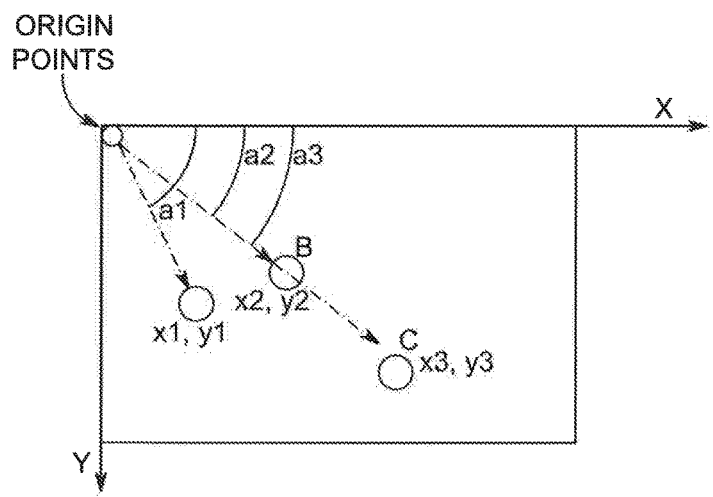

In another embodiment, the Y coordinate can be used to define a higher-priority location for placement of UI elements as described above. In another embodiment, an angle from the X axis can be used. The highest priority UI element is placed at the contact point which has the largest angle from a given line and origin point. This is illustrated in FIG. 17 where an origin point and an X axis is used to determine angles a1, a2, and a3 from the origin to contact points A, B, and C. The higher angled contact points are used to place the higher priority UI elements. In another embodiment, the angle from the Y axis can be used. In another embodiment, the combination of X-Y coordinate and the angle can be used to determine higher-priority contact points.

Operation of the above during anticipated use is described. A user contacts the touch screen simultaneously at several points (although contact does not need to be simultaneous). The UI elements disappear from the original docking position on the layout and a layer stack is formed. The layer depth is determined based on the UI element quantity and the contact point quantity. The layers are created. The UI elements are logically assigned to each layer. In one embodiment, the UI elements are sorted in a predetermined order (based on priority or any rule) and they are orderly assigned to each layer. The layers are arranged orderly in the layer stack based on the UI element order so the 1st UI element is on the top layer and the last UI element is on the bottom layer. A predetermined layer change rule and layer change user input method is associated to the layer stack. The UI elements assigned to the top layer appear at the user contact points. The UI elements on the top layer follow a predetermined order rule.

In one embodiment, the system defines the left up corner of the layout as the origin point and the right direction is the positive direction for the horizontal coordinate (x). The UI element having the highest priority of the current layer is placed at the left-most contact point and the UI element having the lowest priority is placed at the right-most contact points. In another embodiment, the Y coordinate can be used. In another embodiment, the angle from the X axis can be used. The highest priority UI element is placed at the contact point which has the largest angle. In another embodiment, the angle from the Y axis can be used. In another embodiment, the combination of X-Y coordinate and the angle can be used The UI elements assigned to the top layer are activated for the user interaction. The user can use any of the touching fingers to interact with the UI elements by tapping the UI element without lifting the rest touching fingers. Alternatively, the fingers may be lifted and a UI element activated by tapping.

The UI elements assigned to the top layer persist to be displayed and they are still activated for the user interaction although the user leaves all contact points off the touch screen. The user can lift all fingers off the touch screen and use any finger or other input equipment to selectively interact with any of the displayed UI elements. The UI elements assigned to the top layer appear at new contact locations if the user uses the same amount of the fingers to touch the screen on the new locations. The top layer changes in response to the layer change user input if the user makes a predefined change trigger on the touch screen (e.g., swiping). The layer stack is re-formed if the user uses a different amount of the fingers to touch any place on the touch screen. In one embodiment of the present invention, the layer stack is destroyed and all UI elements return to the original docking position if the user lifts all fingers from the touch screen and an exit criteria is met. In one embodiment, the exit criteria can be a timeout such that after a predetermined period of no contact with touch screen 126, all UI elements return to an original docking position. Thus, a user will place, for example, three fingers on the touch screen, holding them on the touch screen and tapping an individual finger to activate a certain UI element. When all fingers are removed from the screen, all UI elements return to the original position as shown in FIG. 2.

Alternative Techniques for Layer Change

While a layer change was described above by a user swiping their contact points downward, alternative techniques for changing layers of UI elements are envisioned. In these alternative techniques all contact points on screen 126 will move in unison to change layers. Any movement will change the layer so long as all contact points move in unison. Some examples are given in FIG. 18 through FIG. 20 with hand 301 omitted for clarity.

Figure 18:
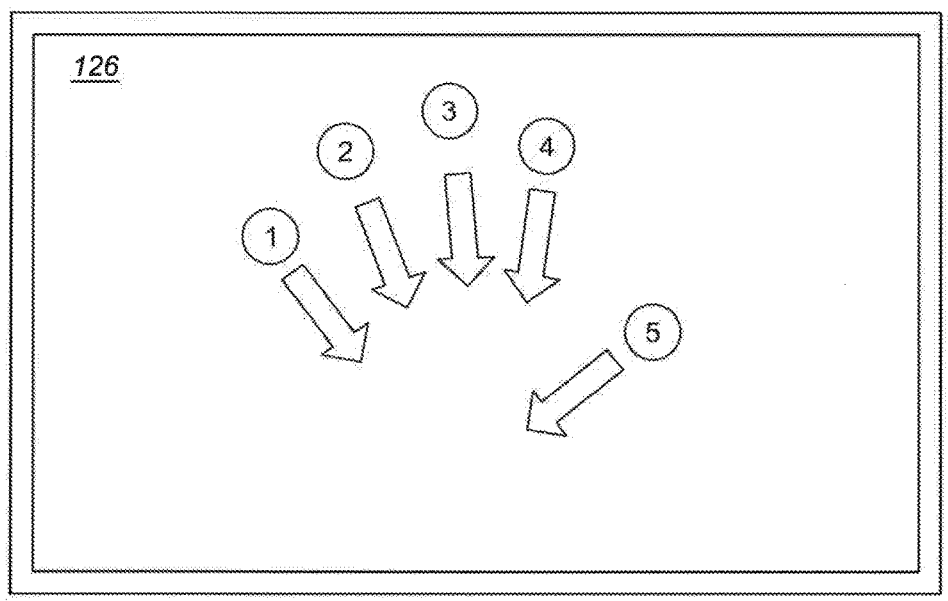
Figure 19:
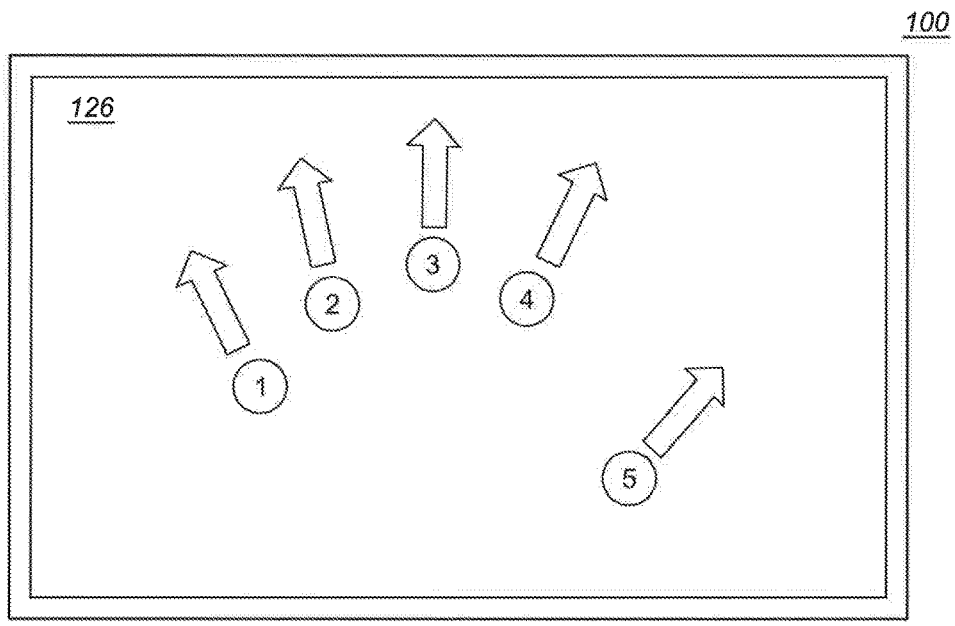
Figure 20:
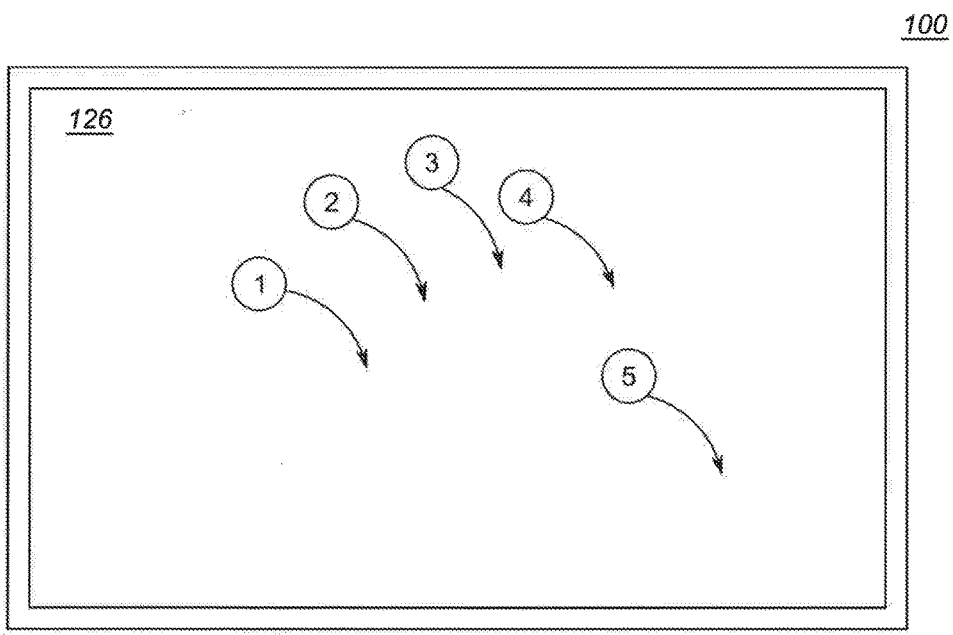

As shown in FIG. 18, "grasp" motion may be used to toggle between layers. Alternatively, a "spread" motion may be used (FIG. 19). A straight shift (up, down, right, left, left bottom corner to right up corner, etc) may be used to change between layers. This was illustrated in FIG. 10 with a shift "down", however a shift in any direction may change layers. Finally, any rotation of the hand (contact points) may be used to change layers (FIG. 20). FIG. 20 shows a rotation right, however any rotation may be used to switch between layers.

Once the contact points have moved over a predefined threshold and a change gesture (grasp, rotate, . . . etc.) is recognized by the system. A layer change happens that the lower layer becomes the top layer and active and the previous top layer becomes inactive. The threshed can be cumulated distance each contact point has moved or it can be the time the movement lasts. Note that there might be more than 2 layers for the layer stack. The new layer order after the change is based on the predetermined changing rule.

One embodiment of the change rule can be a two direction circular change which comprises a positive change and a negative change. So directional "swiping" or rotating movements have to be made to change a layer.

Layers can change based on a direction of a swipe. For example, if there exists five layers 1, 2, 3, 4, 5, then after a positive change (e.g., left to right, rotate right, . . . , etc.) the top layer is layer 2 and the order of the layer stack is 2, 3, 4, 5, 1. After a negative change, the top layer is layer 5 and the order of the layer stack is 5, 1, 2, 3, 4. The change polarity (positive or negative) is determined by the movement directions. For example swiping up shift causes positive change and swiping down causes the negative change. In a similar manner rotating clockwise and counter clockwise can be associated with positive and negative change.

In another embodiment the change rule can be a one direction circular change such that a series of predefined layer change user inputs can cause the layers continuously to change in one direction. For example, one input causes the layer order to change from 1, 2, 3, 4, 5 to 2, 3, 4, 5, 1 and another input causes the order to be 3, 4, 5, 1, 2. In this condition, the layer change user input can be a simple long press that the user keeps all contact points touching on the screen over amount of time. Or it can be any layer change user input type described in the previous sections (e.g., swipe, rotate, . . . , etc)

Another embodiment can be priority based change. The user frequent used or the favorite layer can be always placed at a known order when it is deactivated from the top layer. So it can be revert back easily.

Considering a 5-layer two direction circular stack, the layer 1 is the favorite which has the highest priority. The layer 1 can be always placed at the bottom layer so a negative change can immediately activate layer 1. A user can activate layer 2 using positive change, the stack becomes 2, 3, 4, 5, 1. The user can continue to activate layer 3 using a positive change. The stack becomes 3, 4, 5, 2, 1. If the user uses a negative change, layer 1 can be immediately activated and the stack becomes 1, 3, 4, 5, 2.

The new UI elements of the current top layer can appear at the locations based on predetermined rule. In one embodiment, the new UI elements can appear at the new locations where the user contact points currently locate. In another embodiment, the new UI elements can appear at the same locations where the previous UI elements appeared.

In all layer changes, there may exist a voice announcement or other kind of feedback to user to let him know which layer is NOW the top layer, when a layer change happens.

The specification and figures are to be regarded in an illustrative rather than a restrictive sense, and all such modifications are intended to be included within the scope of present teachings.

Figure 21:
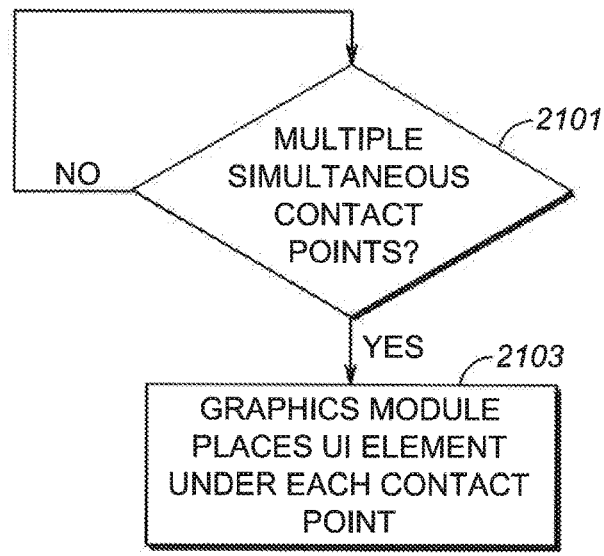
FIG. 21 and FIG. 22 are flow charts chart showing operation of the touch screen of FIG. 1.

FIG. 21 is a flow chart showing operation of device 100. The logic flow of FIG. 21 assumes that an initial configuration of touch screen 126 having all user interface elements in an original "docked" position, with a priority for each user interface element already selected or pre-selected. UI elements comprises places on the touch screen where the user may interact, the interaction of which executes a particular function.

The logic flow begins at step 2101 where screen contact module 138 determines if more than a single simultaneous contact point on the touch screen has been detected. If not, the logic flow returns to step 2101 otherwise the logic flow continues to step 2103. At step 2103 contact module 138 instructs graphics module 140 to place a UI element under each contact point on touch screen 126. The logic flow returns to step 2101 where more than a single simultaneous contact point on the touch screen has again been detected. If so, the previously-placed UI elements may be repositioned under the again-detected contact points on the touch screen at step 2103.

As described above, in FIG. 21 the contact points may comprise finger contact points. Additionally, the step of placing a UI element under each finger contact point comprises the step of placing layers of UI elements under each finger contact point. As described above the UI elements may be prioritized such that the step of placing the UI element under each contact point comprises the step of placing UI elements based on their priority. Higher priority UI elements may be placed at higher angles from an axis and an origin, at a left-most position on the touch screen, at lower angles from an axis and an origin, or at a right-most position on the touch screen.

Figure 22:
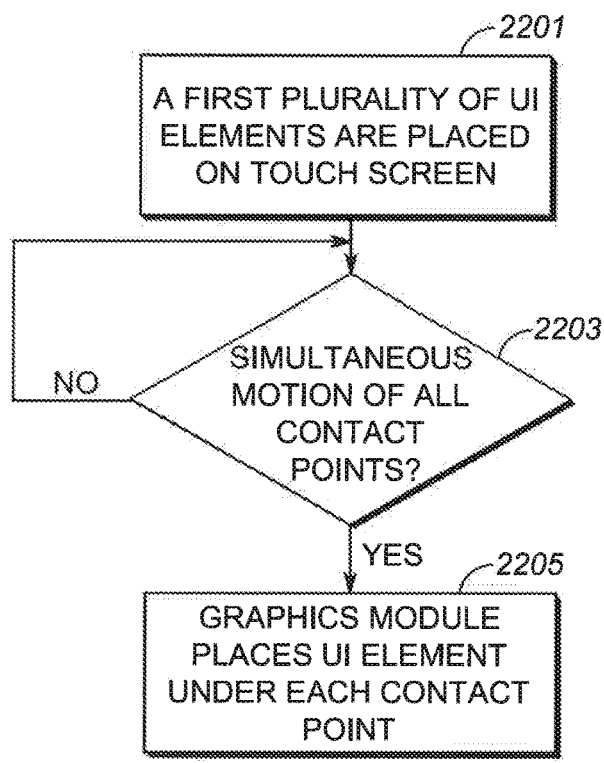

FIG. 22 is a flow chart illustrating how layers are cycled. The logic flow in FIG. 22 begins at step 2201 where a first plurality of UI elements have been previously placed on touch screen 126. The logic flow begins at step 2203 where contact module 138 detects if all contact points on touch screen 126 have moved simultaneously a predetermined amount. If not, the logic flow returns to step 2203. However, if so, contact module 138 instructs graphics module 140 to place a second plurality of UI element under each contact point on touch screen 126 (step 2205). As discussed above, the step of detecting that all contact points on the touch screen have moved simultaneously comprises the step of determining if all contact points rotated right, rotated left, moved right, moved left, moved up, or moved down. Additionally, as described above, a direction of movement may indicate how layers are switched such that a movement in a first direction causes the layers to switch in a first manner while a movement in a second direction causes the layers to switch in a second manner.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing user interface (UI) elements on a touch screen, the method comprising the steps of:
   displaying, via a display portion of the touch screen, a plurality of UI elements in original docking positions;
   detecting a plurality of simultaneous contact points on the touch screen different from the original docking positions, the number of contact points is less than the number of UI elements in the original docking positions;
   re-arranging the plurality of UI elements from respective original docking positions to place one of the plurality of UI elements under each contact point on the touch screen and to place multiple layers of the plurality of UI elements under on or more of each of the finger contact points in response to the detected plurality of simultaneous contact points, further activation of any one re-arranged UI element of which causes a particular corresponding function, application, or program to be executed;
   detecting that all contact points on the touch screen moved simultaneously a predetermined amount; and
   swapping a background layer of the layers of UI elements to foreground layer of the layers of UI elements under the respective finger contact points in response to the detected simultaneously move;
   wherein a detected direction of simultaneous movement indicates how layers are switched such that a movement in a first direction causes the layers to switch in a first manner while a movement in a second direction causes the layers to switch in a second manner different from the first manner.

2. The method of claim 1, further comprising the steps of:
   detecting a release of the plurality of simultaneous contact points and subsequently detecting a second plurality of simultaneous contact points on the touch screen different from the plurality of simultaneous contact points and different from the original docking positions; and
   further re-arranging the previously re-arranged plurality of UI elements to place one of the plurality of UI elements under each contact point on the touch screen in response to the second detected plurality of simultaneous contact points.

3. The method of claim 1, wherein each of the plurality of simultaneous contact points is a finger contact point.

4. The method of claim 1, wherein the step of detecting that all contact points on the touch screen have moved simultaneously comprises the step of determining if all contact points rotated right, rotated left, moved right, moved left, moved up, or moved down.

5. The method of claim 1, the method further comprising:
   during the step of re-arranging the plurality of UI elements under each contact point, selecting the plurality of UI elements from the available U elements based on respective priorities of each of the available UI elements.

6. The method of claim 5, wherein higher priority available UI elements are placed at a left-most position on the touch screen.

7. The method of claim 5, wherein higher priority available UI elements are placed at a right-most position on the touch screen.

8. The method of claim 1, wherein the UI elements are taken from the group consisting of: a window, a text box, a hyper link, a button, a drop down list, a scroll bar, a list box, a combo box, a radio button, a cycle button, a control knob, a data grid, and a switch.

9. A device comprising:
   a graphics module configured to display, via a display portion of a touch screen integrated with the device, a plurality of UI elements in original docking positions;
   an electronic contact module configured to detect a plurality of simultaneous contact points on the touch screen different from the original docking positions, the number of contact points is less than the number of UI elements in the original docking positions;
   the graphics module further configured to, responsive to the electronic contact module detecting the plurality of simultaneous contact points on the touch screen different from the original docking positions, re-arrange the plurality of UI elements from respective original docking positions to place one of the plurality of UI elements under each contact point on the touch screen and to place multiple layers of the plurality of U elements under on or more of each of the finger contact points, further activation of any one re-arranged UI element of which causes a particular corresponding function, application, or program to be executed;
   the electronic contact module further configured to detect that all contact points on the touch screen moved simultaneously a predetermined amount; and
   the graphics module further configured to swap a background layer of the layers of UI elements to foreground layer of the layers of UI elements under the respective finger contact points in response to the detected simultaneously move;
   wherein a detected direction of simultaneous movement indicates how layers are switched such that a movement in a first direction causes the layers to switch in a first manner while a movement in a second direction causes the layers to switch in a second manner different from the first manner.

10. The device of claim 9, where:
    the electronic contact module is further configured to detect a release of the plurality of simultaneous contact points and subsequently detect a second plurality of simultaneous contact points on the touch screen different from the plurality of simultaneous contact points and different from the original docking positions; and
    the graphics module is further configured to re-arrange the previously re-arranged plurality of UI elements to place one of the plurality of UI elements under each contact point on the touch screen in response to the second detected plurality of simultaneous contact points.

11. The device of claim 9, wherein the contact point is a finger contact point.

12. The device of claim 9, wherein the simultaneous move comprises all contact points rotated right, rotated left, moving right, moving left, moving up, or moving down.

* * * * *